United States Patent
Binkley et al.

(10) Patent No.: US 7,833,371 B2
(45) Date of Patent: Nov. 16, 2010

(54) ENHANCED MULTI-LAYERED SHINGLE

(75) Inventors: Jesse A. Binkley, Midlothian, TX (US); Perry J. Prudhomme, Waxahachie, TX (US); Frank M. Bartolic, Ennis, TX (US); Louis T. Hahn, Waxahaxhie, TX (US); Daniel C. DeJarnette, Tuscaloosa, AL (US); Charles M. Reed, Tuscaloosa, AL (US); Richard Allen Chasteen, Jr., Northport, AL (US); John W. Haughton, Decatur, AL (US); J. Gary Falls, Northport, AL (US); Paul G. Wilson, Waxahaxchie, TX (US); Casimir Paul Weaver, Northport, AL (US)

(73) Assignee: Elk Premium Building Products, Inc., Dallas, TX (US)

( * ) Notice: Subject to any disclaimer, the term of this patent is extended or adjusted under 35 U.S.C. 154(b) by 0 days.

(21) Appl. No.: 12/474,041

(22) Filed: May 28, 2009

(65) Prior Publication Data
US 2009/0229217 A1 Sep. 17, 2009

Related U.S. Application Data

(62) Division of application No. 10/862,824, filed on Jun. 7, 2004.

(51) Int. Cl.
B32B 7/08 (2006.01)
B32B 37/00 (2006.01)
B29C 65/00 (2006.01)
C08J 5/00 (2006.01)
E04D 1/00 (2006.01)
E04D 1/34 (2006.01)

(52) U.S. Cl. .................. 156/92; 156/308.2; 52/520; 52/552

(58) Field of Classification Search .................. 156/66, 156/91, 92, 93, 278, 280, 290, 291, 295, 156/308.2, 308.4, 309.6, 309.9; 52/518, 52/519, 520, 526, 543, 544, 545, 546, 547, 52/548, 549, 550, 551, 552; 428/139, 140
See application file for complete search history.

(56) References Cited

U.S. PATENT DOCUMENTS

| 1,765,796 | A | * | 6/1930 | Kirschbraun | .................. 52/543 |
| 2,232,786 | A | | 2/1941 | Kendall | |
| 4,102,107 | A | | 7/1978 | Barker et al. | |
| 4,466,226 | A | | 8/1984 | Rohner | |
| 4,671,037 | A | | 6/1987 | Bienvenu | |
| 5,305,569 | A | | 4/1994 | Malmquist et al. | |
| 5,421,134 | A | | 6/1995 | Hannah et al. | |
| 5,666,776 | A | * | 9/1997 | Weaver et al. | .................. 52/557 |
| 5,671,577 | A | | 9/1997 | Todd | |
| 5,950,387 | A | | 9/1999 | Stahl et al. | |
| 5,956,913 | A | | 9/1999 | Nicholson | |

(Continued)

Primary Examiner—Richard Crispino
Assistant Examiner—Brian R Slawski
(74) Attorney, Agent, or Firm—Baker & McKenzie LLP

(57) ABSTRACT

A multi-layered roofing shingle is described. The layers of the shingle are connected via a mechanical fastener. A method for manufacturing a multi-layered shingle is also described. The method includes aligning the layers of the shingle, and connecting the layers via at least one mechanical fastener. Further described is a multi-layered shingle having layers that are mechanically fastened by deforming one of the layers into one of the other layers.

30 Claims, 9 Drawing Sheets

U.S. PATENT DOCUMENTS

| | | |
|---|---|---|
| 6,014,847 A | 1/2000 | Phillips |
| 6,083,592 A | 7/2000 | Chich |
| 6,145,265 A | 11/2000 | Malarkey et al. |
| 6,289,648 B1 | 9/2001 | Freshwater et al. |
| 6,397,546 B1 | 6/2002 | Malarkey et al. |
| 6,470,642 B1 | 10/2002 | Eads |
| 6,471,812 B1 | 10/2002 | Thompson et al. |
| 6,510,664 B2 | 1/2003 | Kupczyk |
| 6,679,020 B2 | 1/2004 | Becker et al. |
| 6,968,662 B2 | 11/2005 | Rodrigues |
| 2004/0079042 A1 | 4/2004 | Elliott |
| 2004/0206035 A1 | 10/2004 | Kandalgaonkar |

* cited by examiner

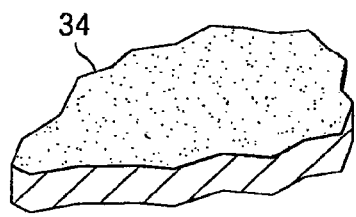
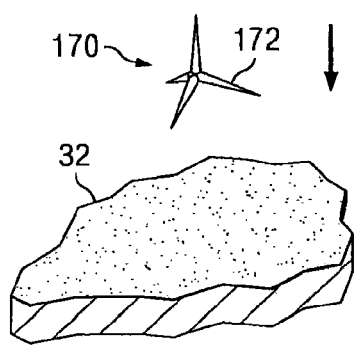
FIG. 6
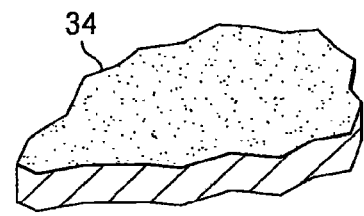
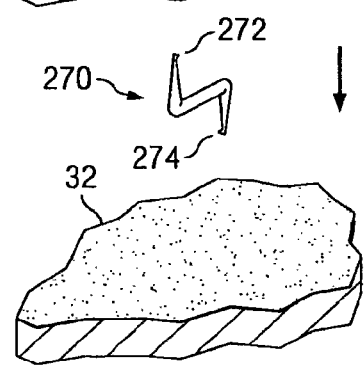
FIG. 7
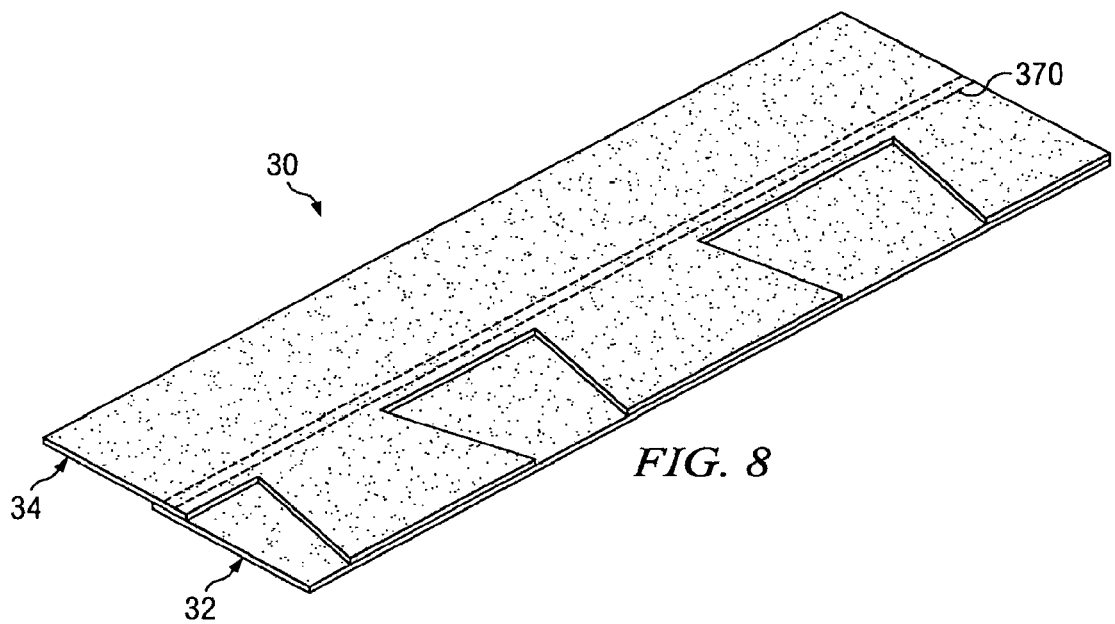
FIG. 8

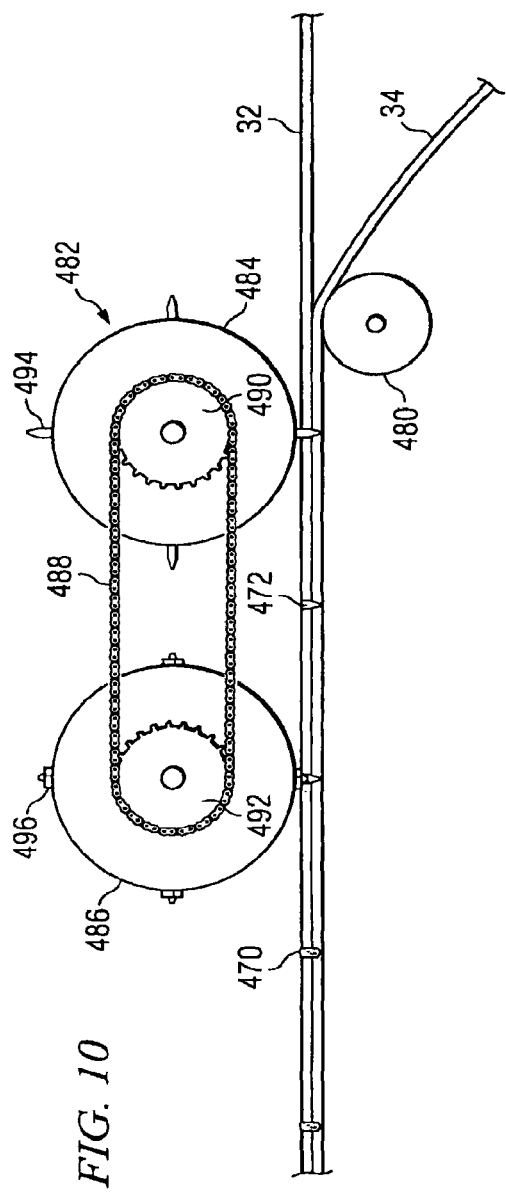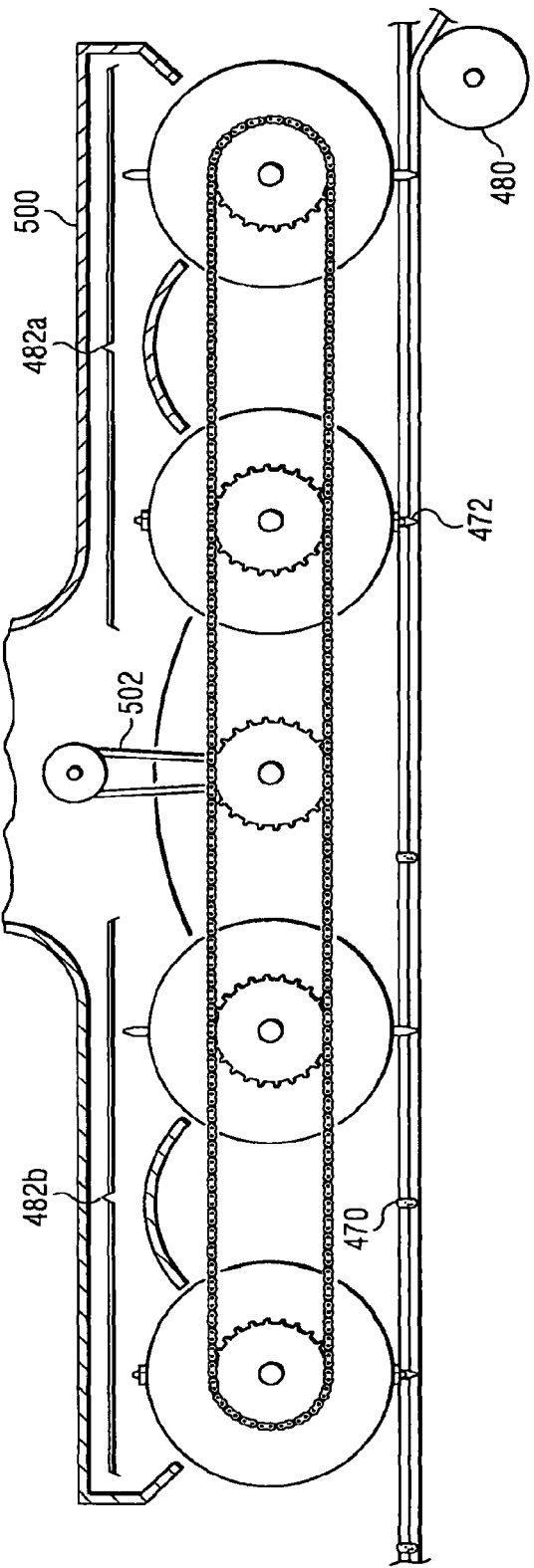

ENHANCED MULTI-LAYERED SHINGLE

RELATED APPLICATION

The present disclosure is a divisional patent application of, and therefore claims priority to, U.S. patent application Ser. No. 10/862,824, filed Jun. 7, 2004.

TECHNICAL FIELD

Disclosed embodiments herein relate generally to multi-layered roofing shingles, and more particularly to systems and methods for improving the bond between the layers of such shingles.

BACKGROUND

Roofing shingles have long been used to provide protection for housing structures. Laminated, or multi-layered, shingles are commonly used in roofing applications due to the increased protection and improved aesthetics provided by such shingles.

Multi-layered shingles utilize various forms of adhesive to interconnect the individual layers of the shingle. It has been discovered that, over time, the adhesive used in connecting the layers may weaken, or fail, which can prove detrimental to the roofing structure. For example, failed adhesive can cause individual shingle layers to slide, or slump, relative to one another, thereby resulting in an aesthetically displeasing appearance of the roofing structure. In more extreme cases, slumping can lead to overall failure of the roofing structure. Such problems are particularly relevant in roofing structures disposed in warm climates and/or those roofing structures having a steep pitch.

The above-described slump problem often arises when multi-layered shingles are installed incorrectly. Multi-layered shingles typically include layers of varying size. For example, a top layer of the shingle may have a larger area than a bottom layer of the shingle. Accordingly, methods for installation generally instruct that shingles should be nailed to a roofing structure by driving a nail through the multi-layered portion of the shingle, also referred to as the "common bond" or the "nail zone" portion of the shingle. However, in practice, multi-layered shingles are often incorrectly secured to roofing structures by nailing outside of the common bond. Incorrect installation can occur for a number of reasons, including insufficient instructions, communication barriers, or plain incompetence.

Slump has heretofore been addressed by increasing the size of the common bond and/or applying supplemental or modified adhesives to strengthen the connection between layers of multi-layered shingles. While providing improved performance, these approaches are ultimately limited by the physical and chemical properties associated with the composition of the shingles and the adhesives used in connecting the shingles. Thus, rather than solve the problem of slump, these approaches merely delay the appearance of slump. Moreover, increasing the size of the common bond often entails increasing the size of at least one of the layers, which has proven to be quite costly.

Accordingly, an enhanced multi-layered shingle is desired that eliminates the slump problems associated with conventional multi-layered shingles.

BRIEF SUMMARY

Disclosed herein are multi-layered shingles and related methods of interconnecting the layers of such shingles. In one exemplary embodiment, a roofing shingle is described as having a first layer, a second layer adhesively connected to the first layer, and a mechanical fastener disposed through a portion of the shingle to terminate in at least one of the first and second layers.

In another embodiment, a roofing shingle is described as having a first layer, and a second layer connected to the first layer via at least one mechanical fastener, the mechanical fastener passing through the second layer and terminating within the first layer.

In yet another embodiment, a method for manufacturing a multi-layered shingle having a first layer and a second layer is described as including aligning the first and second layers, and connecting the first and second layers via at least one mechanical fastener.

In yet another embodiment, a method for manufacturing a multi-layered shingle having a first layer and a second layer is described. The method includes aligning the first and second layers, forming at least one hole in the first and second layers, and dispensing molten material into the at least one hole to connect the first and second layers.

In yet another embodiment, a roofing shingle comprising a first layer, and a second layer connected to the first layer via at least one deformation point is described. The at least one deformation point comprises a portion of the shingle in which one of the first and second layers is deformed into the other of the first and second layers.

In yet another embodiment, a method for connecting a first layer of a multi-layered shingle to a second layer of a multi-layered shingle is described. The method includes aligning the first and second layers, and deforming one of the first and second layers into the other of the first and second layers.

BRIEF DESCRIPTION OF THE DRAWINGS

Reference is now made to the following detailed description of the preferred embodiments, taken in conjunction with the accompanying drawings. It is emphasized that various features may not be drawn to scale. In fact, the dimensions of various features may be arbitrarily increased or reduced for clarity of discussion. In addition, it is emphasized that some components may not be illustrated for clarity of discussion. Reference is now made to the following descriptions taken in conjunction with the accompanying drawings, in which:

FIG. 6 illustrates an exploded view of a portion of an alternative multi-layered shingle according to the present disclosure;

FIG. 7 illustrates an exploded view of a portion of yet another alternative multi-layered shingle according to the present disclosure;

FIG. 8 illustrates an isometric view of yet another alternative multi-layered shingle according to the present disclosure;

FIG. 10 illustrates a system for assembling the shingle of FIG. 9;

FIG. 11 illustrates an alternative system for assembling the shingle of FIG. 9;

DETAILED DESCRIPTION

Figure 1A:
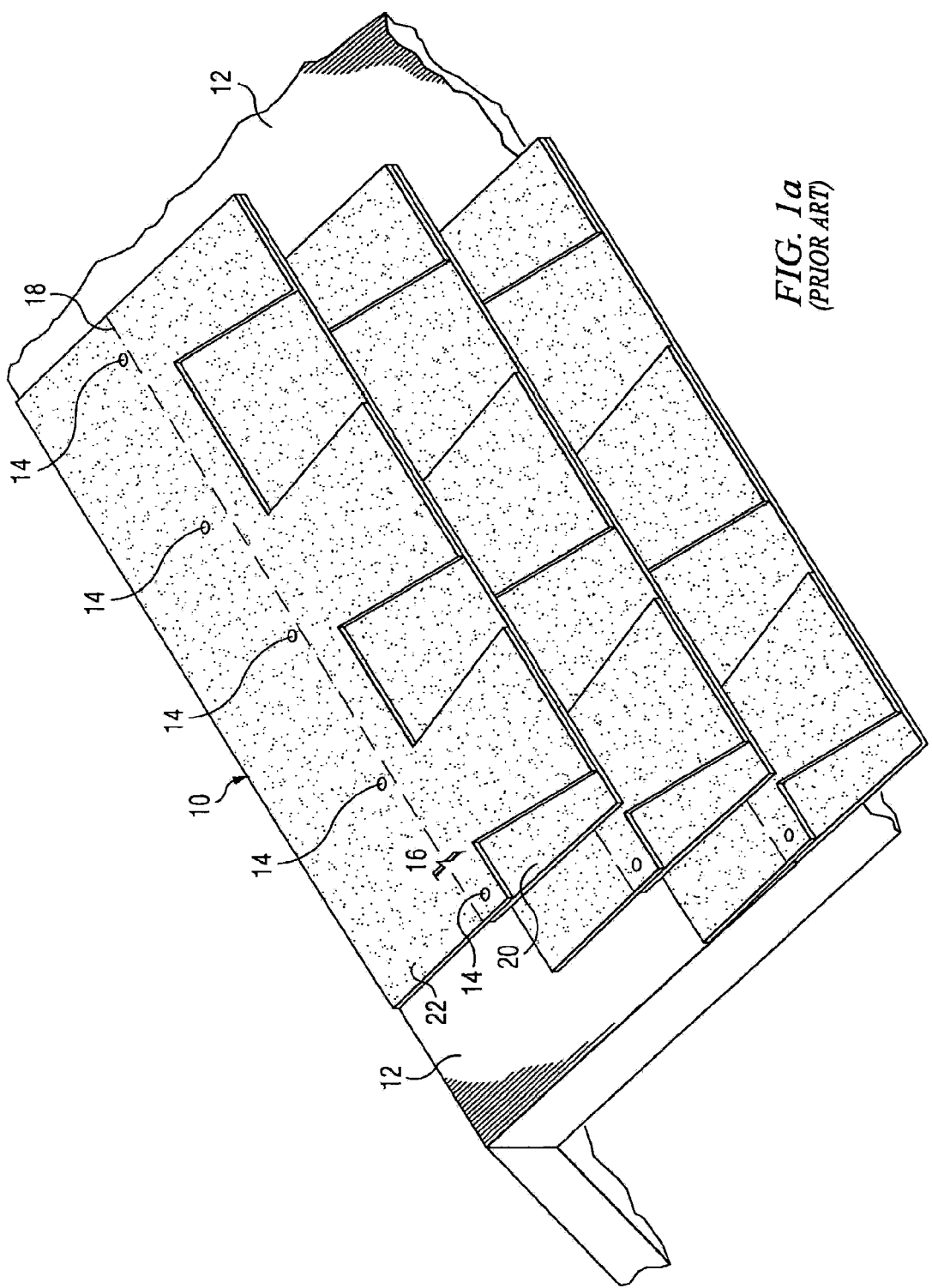
FIG. 1a depicts prior art multi-layered shingles disposed on a portion of a roof.

This disclosure relates generally to multi-layered roofing shingles, and more particularly, to improved systems and methods for interconnecting the layers of multi-layered shingles. However, the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1B:
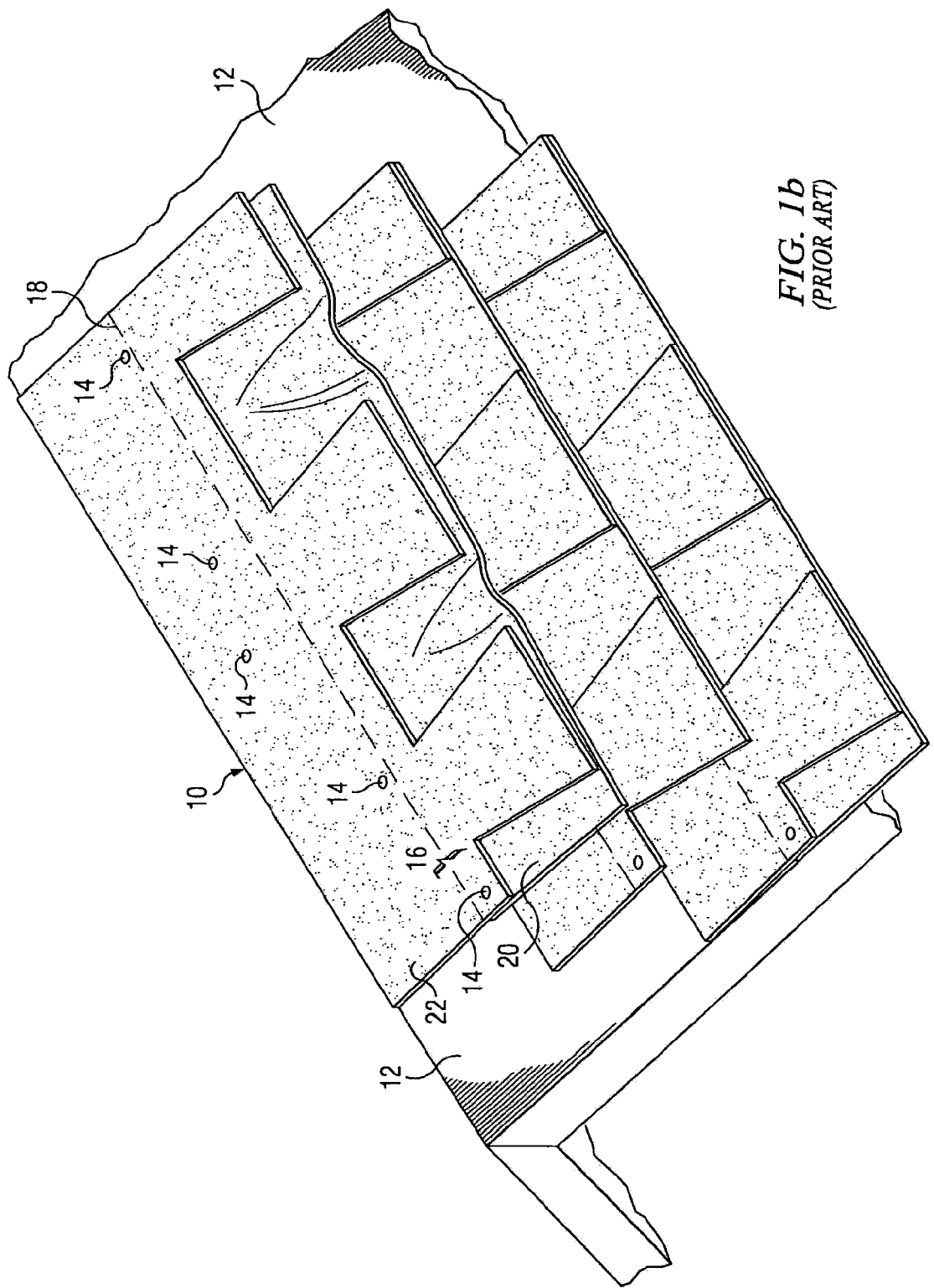
FIG. 1b depicts one of the shingles of FIG. 1a having a lower layer slumped relative to an upper layer.

FIG. 1a illustrates a prior art arrangement in which a conventionally constructed, multi-layered shingle 10 has been incorrectly installed onto a roof 12. In particular, a plurality of securing nails 14 have been driven through the shingle 10 and into the roof 12 in an area outside of a common bond 16 (illustrated by marking 18) of the shingle. Thus, referring to FIG. 1b, the adhesive connecting the layers of the shingle 10 may fail over time, which can cause a lower layer 20 of the shingle to slide under its own weight relative to an upper layer 22 of the shingle. Accordingly, alternative multi-layered shingles are desired.

Figure 2:
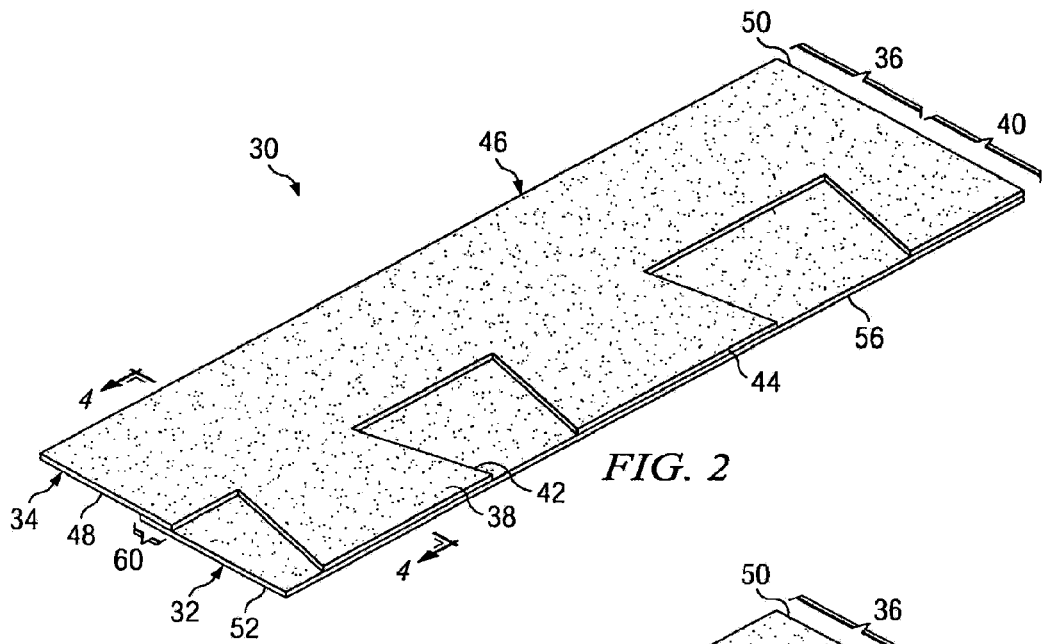
FIG. 2 illustrates an isometric view of an exemplary embodiment of a multi-layered shingle according to the present disclosure.
Figure 3:
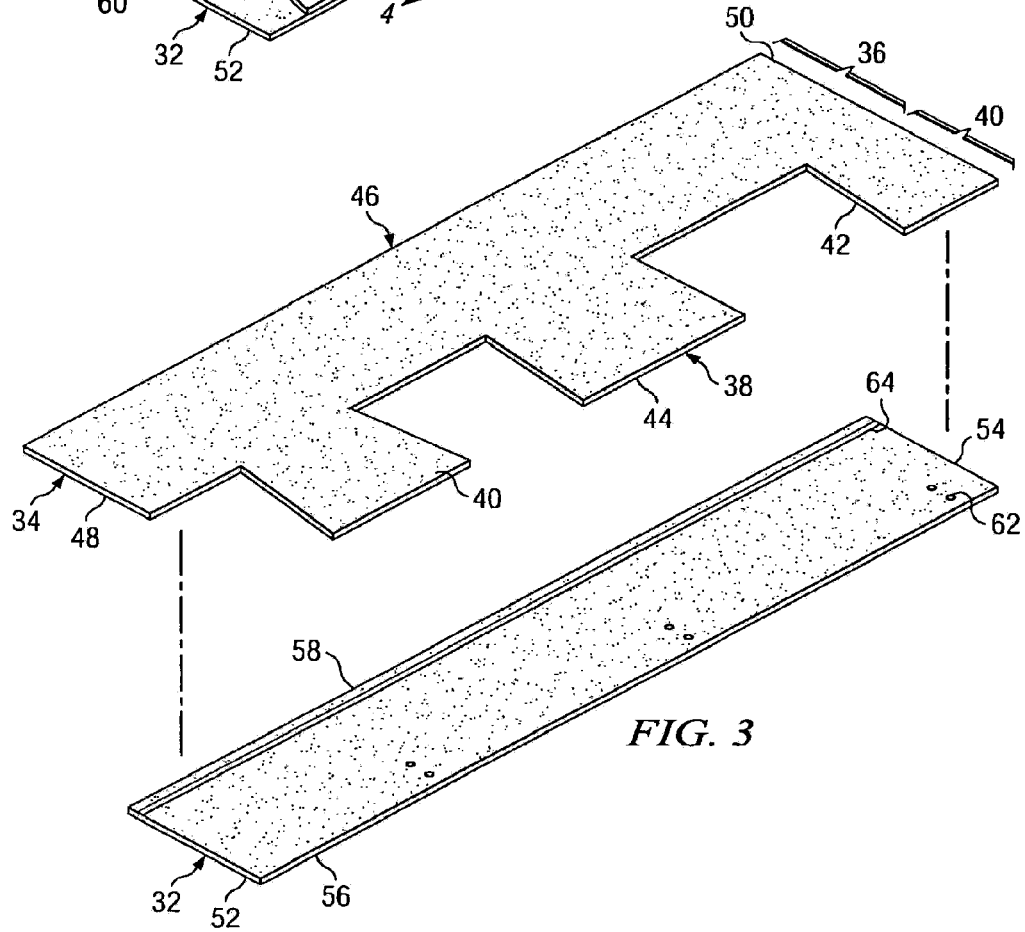
FIG. 3 illustrates an exploded view of the multi-layered shingle of FIG. 2.

Referring now to FIGS. 2 and 3, a multi-layered shingle according to one embodiment of the present disclosure is generally referred to by reference numeral 30. The shingle 30 includes a lower layer 32 disposed adjacent to an upper layer 34. Of course, the shingle 30 may include any number of layers, and the disclosure of two layers is only by way of example. The upper layer 34 includes a rectangular, or headlap section 36, and a plurality of tabs 38 integrally formed with and extending from the headlap section to define a buttlap section 40.

The tabs 38 have varying geometric shapes to define a plurality of corresponding openings 42 for reasons to be described. Although shown and described as having varying geometric shapes, the tabs 38 may have any shape, including uniform and non-uniform shapes. Correspondingly, the openings 42 may have any shape, including uniform and non-uniform shapes. Each of the tabs 38 terminate at a leading edge 44, and are configured such that the leading edges are substantially parallel with a trailing edge 46 defined by the headlap section 36. A pair of lateral edges 48, 50 further define the upper layer 34.

The lower layer 32 is generally rectangular in shape to include opposing lateral edges 52, 54 and opposing leading and trailing edges 56, 58. In practice, and as will be further described, the lower and upper layers 32, 34 are aligned such that their respective leading edges 56, 44 are flush. Accordingly, a portion of the lower layer 32 is exposed via the openings 42. Moreover, the distance defined between the leading and trailing edges 56, 58 of the lower layer 32 is less than the distance defined between the leading and trailing edges 44, 46 of the upper layer 34. More particularly, the trailing edge 58 of the lower layer 32 terminates beyond the buttlap section 40 of the upper layer 34 but before the trailing edge 46 of the headlap section 36. The portion of the lower layer 32 extending beyond the buttlap section 40 and the corresponding portion of the headlap section 36 cooperate to define a coextensive area, or common bond 60, of the shingle 30. The common bond 60 provides a region for interconnecting the lower and upper layers 32, 34 as will be further described.

The shingle 30 may be manufactured in a variety of ways. In one embodiment, the shingle 30 is formed from a fiberglass mat, which is sized and cut to include the lower layer 32 and the upper layer 34. Of course, a variety of materials other than fiberglass are contemplated for the base material. For example, in some embodiments, organic felt may be used as the base material.

Figure 4:
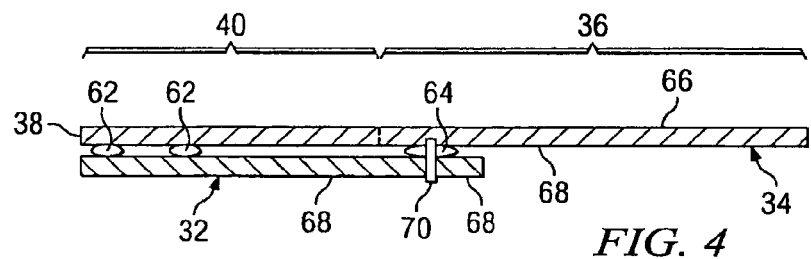
FIG. 4 illustrates a sectional view of the multi-layered shingle of FIG. 2 taken through the line 4-4.

Referring to FIGS. 3 and 4, the shingle 30 is assembled by attaching the lower layer 32 to the upper layer 34. The lower and upper layers 32, 34 may be joined by applying warm adhesive to one or both of the layers, positioning the layers in a desired orientation relative to one another, and pressing the layers together. In one embodiment, a plurality of adhesive dots 62 are applied to the lower layer 32 in an area generally corresponding to the tabs 38 of the upper layer 34. Additionally, an adhesive stripe 64 is applied to the lower layer 32 in an area generally corresponding to the common bond 60. For sake of clarity, the adhesive dots 62 and the adhesive stripe 64 in FIG. 4 are shown enlarged relative to the lower and upper layers 32, 34.

Figure 5:
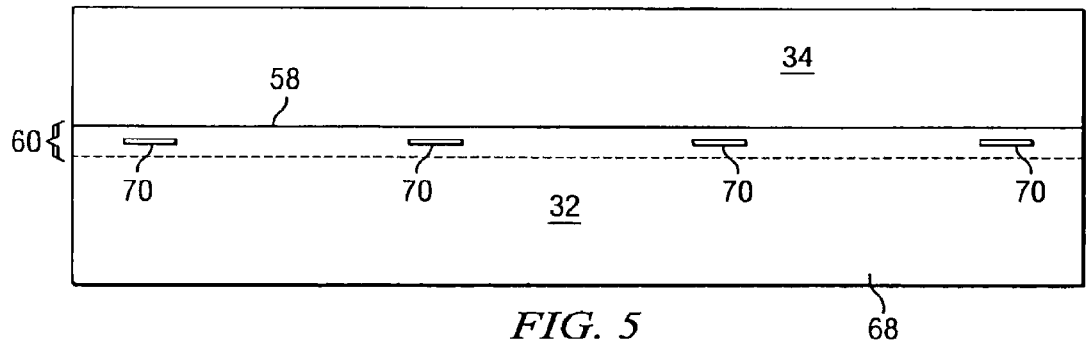
FIG. 5 illustrates a bottom view of the multi-layered shingle of FIG. 2.

Referring to FIGS. 4 and 5, upon pressing of the lower and upper layers 32, 34, the adhesive dots 62 and the adhesive stripe 64 act to join the two layers together. Adhesive may alternatively, or additionally, be applied to the underside of the upper layer 34 in an area corresponding to the lower layer 32. Also, adhesive may be applied in any manner in joining the lower and upper layers 32, 34, and thus is not limited to the dots and stripe arrangement as described. Once joined, the outer side of the upper layer 34 and the portion of the lower layer 32 exposed via the openings 42 together constitute an outer surface 66 of the shingle 30. Also, the underside of the lower layer 32 and the underside of the upper layer 34 extending beyond the lower layer together constitute an inner surface 68 of the shingle 30.

Mechanical fasteners may be provided to supplement, or replace, adhesive in joining the lower and upper layers 32, 34. The mechanical fasteners according to the present disclosure may be any type of mechanically fastening device including but not limited to staples, nails, tabs, cleats, caltrops, pop rivets, plastic rivets, barbs, brads, pins, wire, stitching, thread, mono-filament fishing line and wire. The mechanical fasteners may also be form-fitting fasteners such as molten nails and the like. Generally speaking, the mechanical fasteners according to the present disclosure may be any type of device designed to puncture the shingle 10, form-fit to a punctured portion of the shingle, or otherwise mechanically retain the lower and upper layers 32, 34 together.

In one exemplary embodiment, the mechanical fasteners are stainless steel staples 70, which are inserted through the underside of the lower layer 32 and into the upper layer 34. The staples 70 may be barbed, hooked, clinched or otherwise configured to provide additional grip when inserted. Also, the number of staples 70 inserted into the shingle 30 and the spacing between such staples may vary. Still further, the staples may have any orientation relative to the trailing edge 58 of the lower layer 32, including parallel, perpendicular, and oblique orientations. Upon insertion, the staples 70 terminate within the upper layer 34 such that they do not project through the outer surface 66 of the shingle 30. The staples 70 are arranged to terminate within the upper layer 34 to avoid compromising the structural integrity of the shingle and to avoid posing a danger to an installer of the shingle.

The staples 70 may be inserted during manufacturing, and in some embodiments, shortly after joining of the layers 32, 34 and prior to cooling of the adhesive. For example, insertion of the staples 70 prior to cooling of the adhesive may be desirable to allow the adhesive to flow to the openings created by insertion of the staples, thereby sealing such openings upon cooling. However, the staples 70 may be inserted at any stage of manufacture, and sometimes, after manufacture of the shingle 30. Still further, the staples 70 may be used with or without the adhesive. The tools (not shown) for inserting the staples 70 may include pneumatically or electrically driven industrial staplers, which can be easily incorporated into existing shingle manufacturing operations.

An asphalt (e.g. bituminous) coating may then be applied to each of the outer and inner surfaces 66, 68 of the shingle 30 to increase the structural integrity of the shingle. In addition, a fiberglass mat may also be included in the shingle structure, specifically within the first and/or second shingle layers comprising the shingle. The bituminous coating may be applied over the first and second shingle layers. The outer surface 66 may then be coated with various types of mineral granules to protect the asphalt coating and thus forming a composition shingle. The mineral granules may also add color to the shingle 30 and provide fire and ultraviolet radiation resistance for the shingle. For some applications, ceramic-coated mineral granules may be applied to the outer surface of the shingle 30. Also, a wide range of mineral colors may be used to provide the desired color for the shingle 30.

The inner surface 68 of the shingle 30 may be coated with various inert minerals with sufficient consistency to seal the asphalt coating. In some embodiments, powdered limestone may preferably be applied to the inner surface 68. The shingle 30 may then be installed onto a roofing structure by nailing the shingle to the roof (not shown).

As can be appreciated, the application of mechanical fasteners, such as the staples 70, during manufacturing of the shingle 30 alleviates the need to nail the shingle through the common bond 60 during installation. Moreover, as mechanical fastening of the layers 32, 34 is completely independent of the installation process, human installation error with regard to nail positioning is obviated, thereby avoiding the slump problems associated with prior art multi-layered shingles.

Various shingles (such as shingle 30) manufactured according to the present disclosure have been heat tested to evaluate their failure temperatures, i.e. the temperatures that caused the shingles to experience slump. The shingles were subjected to various measures of heat for varying amounts of time. None of the shingles experienced failure, even when subjected to temperatures of up to and beyond 250 degrees Fahrenheit. It is to be appreciated that the test results described herein are not meant to limit use of the shingle 30 to certain temperature ranges, but rather, to merely illustrate the resistance to slumping provided by the principles of the present disclosure.

Various types of mechanical fasteners may be used other than the staples 70. Referring now to FIG. 6, an alternative embodiment is shown in which the lower and upper layers 32, 34 are joined via caltrops 170, one of which is shown. Each caltrop 170 includes a plurality of legs 172, which are provided to grip the lower and upper layers 32, 34 when joined. The caltrops 170 may be inserted between the lower and upper layers 32, 34 prior to interconnection, and thus, upon pressing, the caltrops 172 "bite" into each of the lower and upper layers to provide an effectively secure connection that will prevent slumping between the layers.

Referring to FIG. 7, in another embodiment, the caltrop 170 may be replaced with a barbed cleat 270 having an upper spike 272 to engage the upper layer 34 and a lower spike 274 to engage the lower layer 32. As can be appreciated, the caltrops 170 and barbed cleats 270 may terminate within each of the lower and upper layers 32, 34 such that neither fastener projects through the outer or inner surfaces 66, 68 of the shingle 30.

Referring to FIG. 8, in yet another embodiment, a stitching 370 may be used to interconnect the lower and upper layers 32, 34. For example, the stitching may include a Dacron® thread that is used to stitch the lower and upper layers 32, 34 together during or after the manufacturing process.

Although not shown, other mechanical fasteners are contemplated such as fasteners that, when installed, pass through each of the outer and inner surfaces 66, 68. Such fasteners may be riveted such that their extension beyond the outer surface 66 does not pose a safety hazard. Moreover, such fasteners may additionally include grommet-like structures, which can be provided to effectively seal the openings in the outer and inner surfaces 66, 68 caused by insertion of the fastener. Still further, additional types of mechanical fasteners are contemplated that provide a thermoplastic or non-thermoplastic linkage between the layers 32, 34 of the multi-layered shingle 30.

Figure 9:
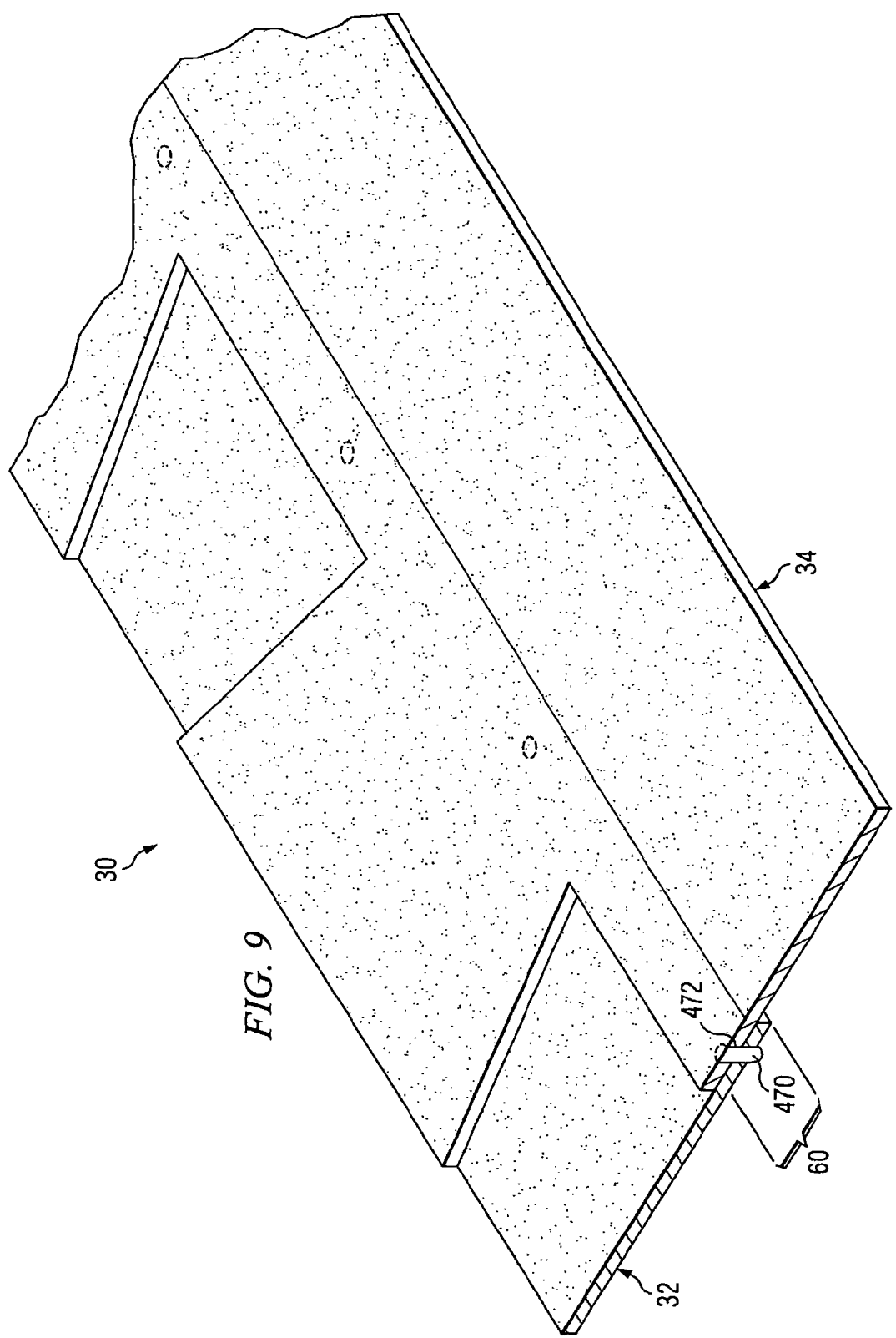
FIG. 9 illustrates a partial isometric, partial sectional view of yet another alternative multi-layered shingle according to the present disclosure.

In additional embodiments, molten-like fasteners, such as molten nails, may be applied to mechanically fasten the layers of multi-layered shingles. Referring now to FIG. 9, the layers 32, 34 of the multi-layered shingle 30 are depicted as being fastened via a plurality of molten fasteners 470, which generally constitute fasteners that are molten when initially applied to the shingle 30, yet solidify thereafter to mechanically fasten the layers. For example, the molten fasteners 470 may be formed from any thermoplastic material or liquid material that can be readily cross-linked to a solid including, but not limited to, urethane, rubber, plastic, solder, lead, expanding foam and formulated asphalt. Moreover, it may be desirable to form the molten fasteners 470 from a material having a minimal coefficient of thermal expansion such that the structural integrity of the shingle 30 is not compromised in extreme temperatures.

The molten fasteners 470 may be inserted into corresponding holes 472 formed in the common bond 60 of the shingle 30. The holes 472 may pass entirely through each of the layers 32, 34, or in some embodiments, the holes may pass through one layer and terminate in the other layer. Additionally, the holes 472 may be formed to have any configuration, including uniform and non-uniform configurations. As can be appreciated, the initial molten nature of each molten fastener 470 allows the molten fastener to flow and form-fit itself to the corresponding hole 472. Thus, upon solidification, the molten fasteners 470 will have taken the shape of the corresponding hole 472, thereby mechanically fastening the layers 32, 34 together.

In practice, and referring to FIG. 10, the molten fasteners 470 may be applied to fasten the lower and upper layers 32, 34 during manufacturing of the shingle 30. In particular, the lower and upper layers 32, 34 are pressed together via a roller 480 prior to passing adjacent to a molten fastener applicator 482. In some embodiments, the applicator 482 includes a puncture wheel 484 linearly displaced from a dispenser wheel 486. The wheels 484, 486 are linked via a chain 488 extending between drive gears 490, 492 of the wheels 484, 486, respectively. The chain 488 effectively synchs the wheels to have the same rate of rotation. Of course, the wheels 484, 486 may be synchronized in a variety of other manners such as via electronic, mechanical or electro-optical devices and methods.

The puncture wheel 484 includes a plurality of angularly spaced spikes 494 disposed substantially equidistant from one another along the circumference of the wheel 484. The spikes 494 are provided to puncture the shingle 30 along the common bond 60, thereby forming the holes 472 for receiving the molten fasteners 470. The spikes 494 may have a variety of cross-sectional shapes including circular and non-circular cross-sectional shapes. Additionally, the spikes 494 may be uniform or non-uniform in nature.

The dispenser wheel 486 includes a plurality of angularly spaced dispensing spigots 496 disposed substantially equidistant from one another along the circumference of the wheel 486. The dispensing spigots 496 are configured to dispense the molten fasteners 470 into the holes 472 formed in the shingle 30. As can be appreciated, the angular distance between each dispensing spigot 496 substantially corresponds to the angular distance between each spike 494. Moreover, it may be desired that the dispensing spigots 496 have angular positions corresponding to the angular positions of the spikes 494.

In operation, the wheels 484, 486 are actuated to puncture and apply molten material, respectively, to the shingle 30. The molten material form-fits to the hole 472 and solidifies, thereby mechanically fastening the layers 32, 34.

Various types of machines may be used to apply the molten fasteners 470 to the shingle 30. For example, the wheels 484, 486 may be replaced with machines that reciprocate, rather than rotate. Moreover, multiple sets of applicators 482 may be used to apply the molten fasteners 470. Referring to FIG. 11, a pair of applicators 482a, 482b may be used to each supply half the molten fasteners 470 to the shingle 30. The applicators 482a, 482b may be secured to a frame 500, and powered via a motor (not shown), which is operatively connected to the applicators via a drive belt 502. Additionally, a chain 504 is provided to synch the rotation of the wheels associated with the applicators 482a, 482b.

Figure 12:
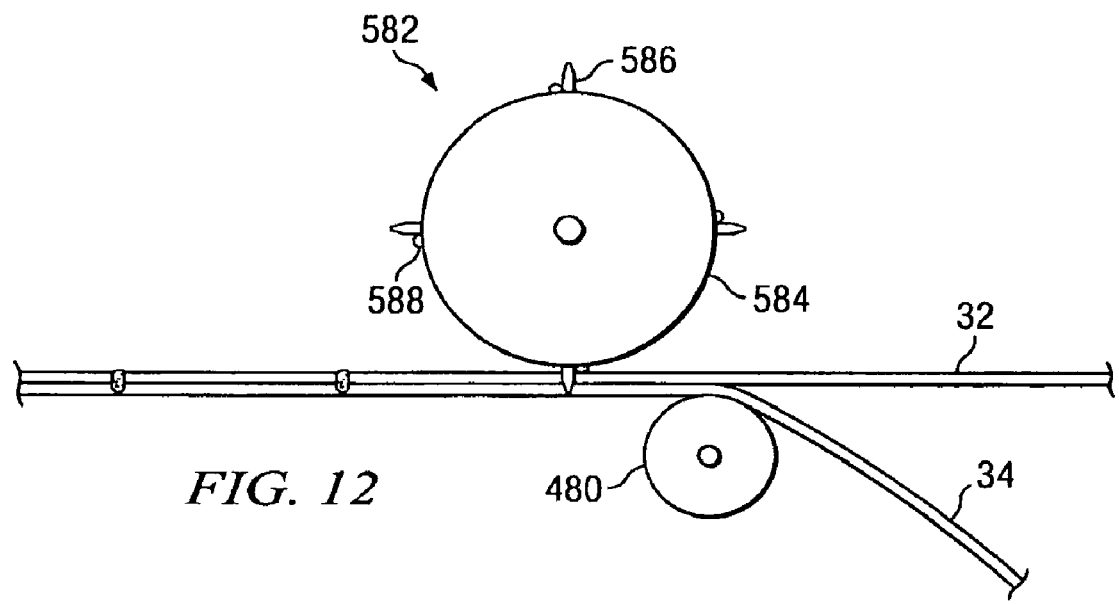
FIG. 12 illustrates an alternative system for assembling the shingle of FIG. 9.

Referring to FIG. 12, the systems of FIGS. 10 and 11 may be replaced with an applicator 582 comprised of a single machine 584. In this embodiment, the machine 584 is a wheel having a plurality of angularly spaced cutting blades 586 disposed substantially equidistant from one another along a circumference of the wheel 584. Of course, the cutting blades 586 may be replaced with any conventional puncturing device such as spikes, punches and the like. The wheel 584 may be driven by any conventional driving means, such as a motor (not shown). The cutting blades 586 are provided to puncture the shingle 30 along the common bond 60. The cutting blades 586 may have a variety of cross-sectional shapes including circular and non-circular cross-sectional shapes. Additionally, the cutting blades 586 may be uniform or non-uniform in nature. Disposed within or adjacent to each of the cutting blades 586 is a dispensing spigot 588, which is configured to dispense molten material into the puncture created in the shingle 30. Accordingly, the punctures created by the cutting blades 586 are immediately filled with molten material, which solidifies to mechanically fasten the layers 32, 34. The cutting blades 586 may or may not rotate at the same speed as the lower and upper layers 32, 34 of the shingle 30.

Figure 13:
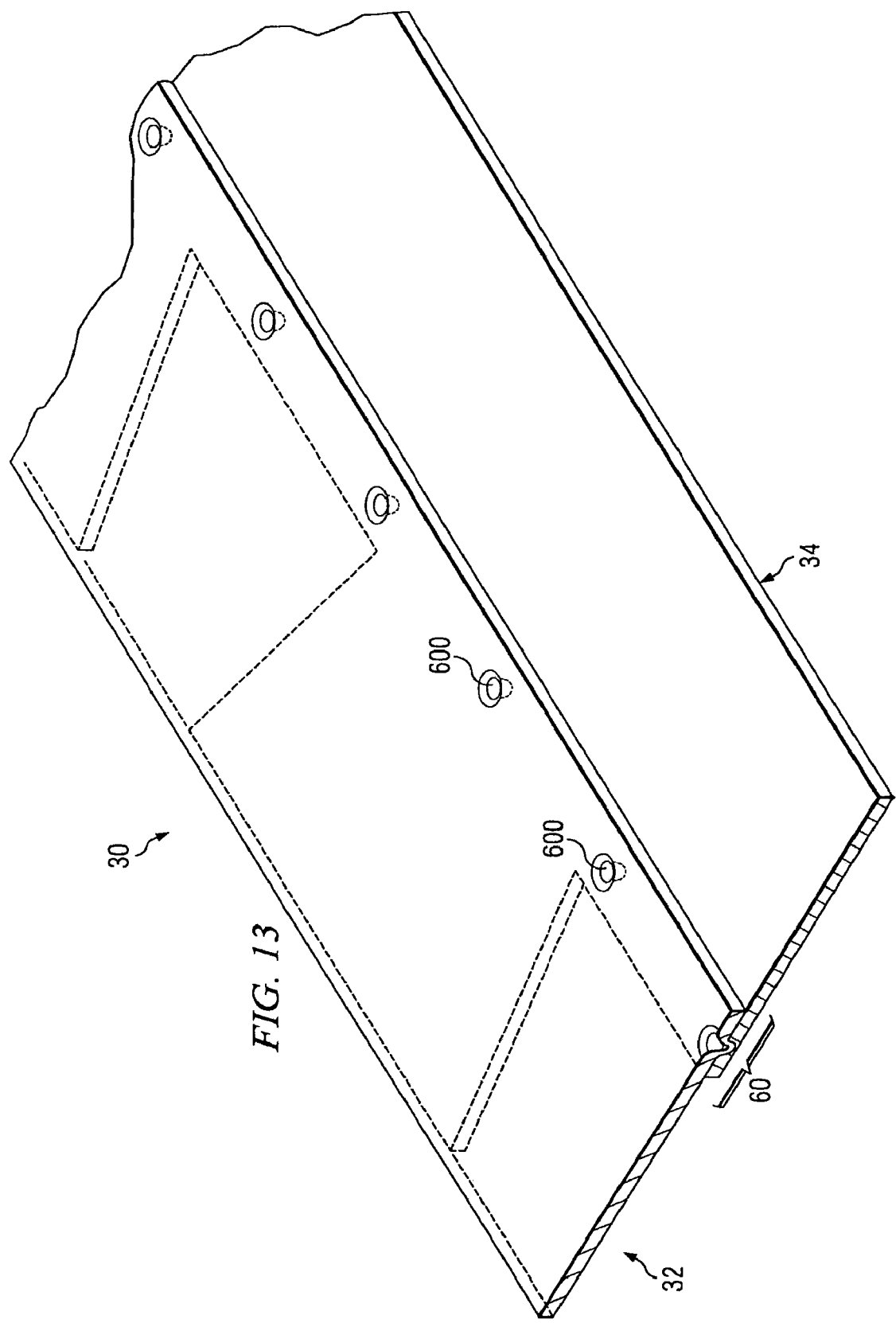
FIG. 13 illustrates a partial isometric, partial sectional bottom view of yet another alternative multi-layered shingle according to the present disclosure.

Referring to FIG. 13, in yet another embodiment, the lower and upper layers 32, 34 of the shingle 30 may be fastened by indenting or deforming one of the layers into the other of the layers. In particular, the lower layer 32 may be deformed into the upper layer 34 along the common bond 60 at one or more deformation points 600. The deformation points 600 may be any shape, and in some embodiments, may be elongated along the common bond 60. The deformation of lower layer 32 into upper layer 34 serves to secure the layers to one another without an extrinsic mechanical fastener. Adhesive may or may not be used to further supplement the deformation points 600.

Figure 14:
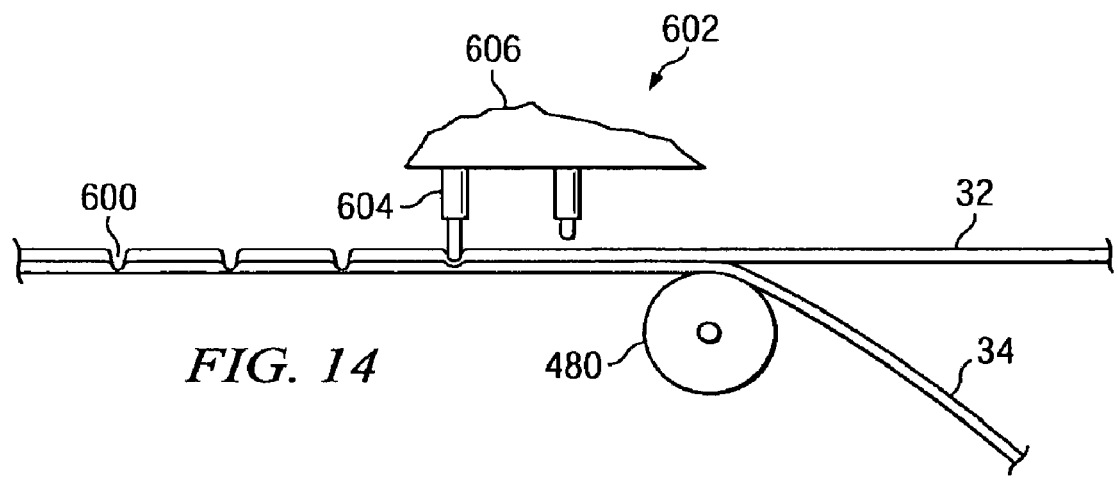
FIG. 14 illustrates a system for assembling the shingle of FIG. 13.

Referring to FIG. 14, the deformation points 600 may be applied to the shingle 30 during manufacturing. For example, the lower and upper layers 32, 34 may be passed across a deformation applicator 602, which in one embodiment, comprises at least one pneumatically driven punch 604 to deform the lower layer 32 into a portion of the upper layer 34. The punch 604 may extend from a frame 606 (a portion of which is shown) associated with the manufacturing operations. In one embodiment, the punch 604 reciprocates to systematically apply deformation points 600 to the shingle 30. In other embodiments, the deformation points 600 may be applied after manufacturing of the shingle 30. Furthermore, various types of deformation applicators 602 other than the punch 604 are contemplated within the present disclosure.

While various embodiments of the multi-layered shingle constructed according to the principles disclosed herein, and related methods of forming such shingles, have been described above, it should be understood that they have been presented by way of example only, and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages. All spatial references, such as "upper," "lower," "outer," "inner," "trailing," "leading," "top," "bottom," and "lateral" are for illustrative purposes only and can be varied within the scope of the disclosure.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A method of manufacturing a composition roofing shingle, the method comprising:

providing a first layer and a second layer each having an interior surface and an exterior surface, the exterior surface of the first layer providing at least a portion of an exterior of the shingle;

adhesively connecting at least a portion of the exterior surface of the second layer adhesively to at least a portion of the interior surface of the first layer;

dispensing at least one fastener heated to malleability within a common bond area that is located between headlap and buttlap portions of the shingle and provides a region for interconnecting the at least a portion of the interior surface of the first layer with the at least a portion of the exterior surface of the second layer; and allowing the at least one fastener heated to malleability to harden where dispensed such that it terminates within the first layer and is not exposed on the external surface of the first layer.

2. The method of claim 1, wherein the first layer includes a first leading edge and the second layer includes a second leading edge, the method further comprising aligning the first and second layers by aligning the first and second leading edges.

3. The method of claim 2, wherein the first layer includes a first trailing edge and the second layer includes a second trailing edge, the distance between the first leading edge and the first trailing edge being greater than the distance between the second leading edge and the second trailing edge, wherein connecting the first and second layers comprises connecting the first and second layers at a portion of the shingle generally corresponding to an area adjacent to the second trailing edge.

4. The method of claim 3, wherein the first layer comprises a head portion integrally formed with a tab portion, the method further comprising adhesively connecting the tab portion to the second layer to define a first adhesive connection.

5. The method of claim 4, further comprising adhesively connecting the head portion to the second layer adjacent to the second trailing edge to define a second adhesive connection.

6. The method of claim 5, wherein the at least one fastener is disposed through a portion of the shingle generally corresponding to the second adhesive connection.

7. The method of claim 1, wherein the at least one fastener is a plug longitudinally extending substantially normal to the exterior surface of the shingle.

8. The method of claim 1, wherein the at least one fastener extends through the second layer and terminates within the first layer.

9. The method of claim 1, further comprising providing a bituminous coating on the exterior surface of the first layer.

10. The method of claim 1, further comprising connecting the first layer and the second layer via at least one deformation point in the common bond area.

11. The method of claim 10, wherein the at least one deformation point comprises forming at least one hole through the second layer corresponding to a portion of the at least one deformation point formed in the first layer, the at least one fastener located within the at least one deformation point.

12. The method of claim 1, wherein the at least one fastener heated to malleability comprises a molten material hardened into the at least one fastener.

13. A method of manufacturing a composition roofing shingle, the method comprising:

providing a first layer and a second layer each having an interior surface and an exterior surface, the exterior surface of the first layer providing at least a portion of an exterior of the shingle;

adhesively connecting at least a portion of the exterior surface of the second layer adhesively to at least a portion of the interior surface of the first layer;

forming at least one hole through the second layer and partially into the first layer within a common bond area that is located between headlap and buttlap portions of the shingle and provides a region for interconnecting the at least a portion of the interior surface of the first layer with the at least a portion of the exterior surface of the second layer;

dispensing a molten material into the at least one hole; and allowing the molten material to harden in the at least one hole such that it terminates within the first layer and is not exposed on the external surface of the first layer.

14. The method of claim 13, wherein forming at least one hole comprises passing the first and second layers adjacent to a molten material applicator, the molten material applicator having a first wheel having at least one cutting blade to form the at least one hole in the first and second layers.

15. The method of claim 14, wherein dispensing molten material comprises passing the first and second layers adjacent to the molten material applicator, the molten material applicator further having a second wheel displaced from the first wheel, the second wheel having at least one dispensing spigot to dispense the molten material into the at least one hole.

16. The method of claim 13, wherein forming at least one hole and dispensing molten material comprises passing the first and second layers adjacent to a molten material applicator, the molten material applicator having a wheel having a plurality of cutting blades to form the at least one hole in the first and second layers, and the wheel further having a plurality of dispensing spigots disposed adjacent to the plurality of cutting blades, the dispensing spigots being provided to dispense the molten material into the at least one hole.

17. The method of claim 13, wherein forming at least one hole and dispensing molten material comprises passing the first and second layers adjacent to a molten material applicator, the molten material applicator having a wheel having a plurality of cutting blades to form the at least one hole in the first and second layers, and the wheel further having a plurality of dispensing spigots disposed within the plurality of cutting blades, the dispensing spigots being provided to dispense the molten material into the at least one hole.

18. The method of claim 13, wherein the first layer includes a first leading edge and the second layer includes a second leading edge, the method further comprising aligning the first and second layers by aligning the first and second leading edges.

19. The method of claim 18, wherein the first layer includes a first trailing edge and the second layer includes a second trailing edge, the distance between the first leading edge and the first trailing edge being greater than the distance between the second leading edge and the second trailing edge, wherein connecting the first and second layers comprises connecting the first and second layers at a portion of the shingle generally corresponding to an area adjacent to the second trailing edge.

20. The method of claim 19, wherein the first layer comprises a head portion integrally formed with a tab portion, the method further comprising adhesively connecting the tab portion to the second layer to define a first adhesive connection.

21. The method of claim 20, further comprising adhesively connecting the head portion to the second layer adjacent to the second trailing edge to define a second adhesive connection.

22. The method of claim 21, wherein the at least one fastener is disposed through a portion of the shingle generally corresponding to the second adhesive connection.

23. The method of claim 13, further comprising providing a bituminous coating on the exterior surface of the first layer.

24. The method of claim 13, further comprising connecting the first layer and the second layer via at least one deformation point in the common bond area.

25. The method of claim 24, wherein the at least one deformation point comprises forming at least one hole through the second layer corresponding to a portion of the at least one deformation point formed in the first layer, the at least one fastener located within the at least one deformation point.

26. A method of manufacturing a composition roofing shingle, the method comprising:

providing a first layer and a second layer each having an interior surface and an exterior surface, the exterior surface of the first layer providing at least a portion of an exterior of the shingle;

adhesively connecting at least a portion of the exterior surface of the second layer adhesively to at least a portion of the interior surface of the first layer;

passing the first and second layers adjacent to a cutting device;

forming at least one hole through the second layer and partially into the first layer with the cutting device, the at least one hole formed within a common bond area that is located between headlap and buttlap portions of the shingle and provides a region for interconnecting the at least a portion of the interior surface of the first layer with the at least a portion of the exterior surface of the second layer;

passing the at least one hole adjacent to a fastener applicator;

dispensing at least one fastener heated to malleability within a corresponding at least one hole; and allowing the at least one fastener heated to malleability to harden where dispensed such that it terminates within the first layer and is not exposed on the external surface of the first layer.

27. The method of claim 26, wherein the cutting device comprises a first wheel having at least one cutting tool to form the at least one hole.

28. The method of claim 27, wherein the fastener applicator comprises a second wheel displaced from the first wheel, the second wheel having at least one dispensing spigot to dispense the at least one fastener into the at least one hole.

29. The method of claim 26, wherein passing the first and second layers adjacent to a cutting device and passing the at least one hole adjacent to a fastener applicator comprises passing the first and second layers adjacent to a single wheel having at least one cutting tool and at least one dispensing spigots disposed within a corresponding at least one cutting tool.

30. The method of claim 14, wherein the at least one fastener heated to malleability comprises a molten material hardened into the at least one fastener.

* * * * *